(12) United States Patent
Wu

(10) Patent No.: US 8,713,804 B2
(45) Date of Patent: May 6, 2014

(54) GARDENING SCISSORS

(75) Inventor: Shih-Piao Wu, Changhua (TW)

(73) Assignee: Jiin Haur Industrial Co. Ltd., Changhua (TW)

( * ) Notice: Subject to any disclaimer, the term of this patent is extended or adjusted under 35 U.S.C. 154(b) by 157 days.

(21) Appl. No.: 13/216,575

(22) Filed: Aug. 24, 2011

(65) Prior Publication Data

US 2013/0047442 A1 Feb. 28, 2013

(51) Int. Cl.
*B26B 13/00* (2006.01)

(52) U.S. Cl.
USPC ................... 30/252; 30/254; 30/260

(58) Field of Classification Search
USPC ........... 30/192, 194, 211, 244, 245, 250–252, 30/254, 260, 341, 342, 351; 285/253; 7/125, 129, 105, 167; 81/177.2, 423, 81/489, 180.1, 436–446; D8/5
See application file for complete search history.

(56) References Cited

U.S. PATENT DOCUMENTS

| | | | | |
|---|---|---|---|---|
| 2,348,903 A * | 5/1944 | Hart | | 30/254 |
| 3,681,845 A * | 8/1972 | Duprey | | 30/341 |
| 5,184,404 A * | 2/1993 | Chen | | 30/250 |
| 5,404,616 A * | 4/1995 | Carmien | | 30/341 |
| 5,454,165 A * | 10/1995 | Thompson et al. | | 30/340 |
| 5,483,747 A * | 1/1996 | Thompson et al. | | 30/254 |
| 5,809,654 A * | 9/1998 | Huang | | 30/250 |
| 5,930,900 A * | 8/1999 | Chang | | 30/341 |
| 6,422,780 B2 * | 7/2002 | Chen | | 30/254 |
| 6,523,266 B2 * | 2/2003 | Yang | | 30/252 |
| 6,594,909 B2 * | 7/2003 | Deville | | 30/341 |
| 6,640,442 B2 * | 11/2003 | Lin | | 30/251 |
| 6,842,983 B1 * | 1/2005 | Hsu | | 30/254 |
| 6,883,208 B1 * | 4/2005 | Huang | | 16/DIG. 41 |
| 7,574,806 B2 * | 8/2009 | Wang | | 30/341 |
| 7,654,005 B2 * | 2/2010 | Perrin | | 30/194 |
| 8,046,924 B2 * | 11/2011 | Block et al. | | 30/251 |
| 2002/0073557 A1 * | 6/2002 | Huang | | 30/341 |
| 2005/0198832 A1 * | 9/2005 | Hsien | | 30/254 |
| 2011/0162213 A1 * | 7/2011 | Goetz et al. | | 30/252 |
| 2011/0203117 A1 * | 8/2011 | Huang | | 30/254 |
| 2013/0205601 A1 * | 8/2013 | Wu, Shih-Piao | | 30/255 |

FOREIGN PATENT DOCUMENTS

| | | | |
|---|---|---|---|
| EP | 0357490 B1 * | 1/1993 | |
| EP | 1316251 A1 * | 6/2003 | |
| EP | 2628383 A1 * | 8/2013 | |
| FR | 2635710 A1 * | 3/1990 | |
| FR | 2832948 A1 * | 6/2003 | |
| FR | 2860388 A3 * | 4/2005 | |

* cited by examiner

*Primary Examiner* — Jason Daniel Prone

(74) *Attorney, Agent, or Firm* — Che-Yang Chen; Law Office of Michael Chen

(57) ABSTRACT

Gardening scissors include two blades facing each other, two connecting blocks, two covers and two handles, wherein each blade is equipped with a perforation at a middle section, and a locking board is extended from one side of rear end of two blades. The connecting blocks have a (half) shell body facing the cover, and a receiving slot with half-oval shape extending from rear end of the shell body. Front end of the receiving slot has a stopping edge, one side of which has a side wing extending therefrom. The cover is symmetrically disposed to face the shell body, so that a second receiving slot, a second stopping edge, a second side wing and a second locking hole are formed on the cover. One end of the handle has an anti-slippery sleeve and the other end has a through hole.

5 Claims, 4 Drawing Sheets

GARDENING SCISSORS

FIELD OF THE INVENTION

The present invention is related to a conjugation structure of a gardening scissor handle, and more specifically to a novel structure that has excellent conjugation strength and can be manufactured easily.

BACKGROUND OF THE INVENTION

According to conventional gardening scissors shown in FIG. 4, the scissors include: two blades (50) facing each other, two sleeves (60) and two handles (70), wherein each blade (50) is equipped with a perforation at the middle section, so a nut and a screw can pass through to engage with each other to secure the two blade (50) in a fixed position. A conjugating unit (51) is extended from the rear end of the blades (50), and the edge of the conjugating unit (51) provides continuous serrate conjugating lines (52). The sleeves (60) are formed with the cross-section surface of the handle (70), and a sleeve opening (61) is formed at the center of the cross-section surface.

During assembly process, the sleeves (60) are secured in front of the handles (70), and the blades (50) are inserted into the sleeve opening (61) of the sleeves (60) through the conjugating unit (51), so that the conjugating lines (52) can pass through the rear end of the sleeve opening (61). When the sleeves (60) resiliently cover the conjugating unit (51), the blades (50) and the handles (70) can engage with each other, so the handles (70) can be used to drive the blades (50) to cut.

However, the structure of conventional gardening scissors may still have problems in practical application, such as: (1) after the blades (50) are inserted, the blades (50) may still separate from the handles (70) due to weak conjugation strength when reverse forces applied; (2) when using the gardening scissors, the stress of the conjugating unit (51) will concentrate on the plastic sleeves (60), so the sleeves (60) are easy to cause wear and deformation, and the sleeve opening (61) can be enlarged to adversely affect the conjugation.

SUMMARY OF THE INVENTION

The technical problem to be solved in the present invention is that conventional gardening scissors do not have strong conjugation strength, which is the problem the inventor would like to solve.

The technical point to solve the problem mentioned above is that the present invention provides gardening scissors that include two blades facing each other, two connecting blocks, two covers and two handles, wherein each blade is equipped with a perforation at a middle section, so a nut and a screw can engage with each other to secure the two blades in a fixed position, and a locking board is extended from one side of rear end of two blades. The connecting blocks have a (half) shell body facing the cover, and a receiving slot with half-oval shape extending from rear end of the shell body. Front end of the receiving slot has a stopping edge, one side of which has a side wing extending therefrom. The side wing and the shell body both have locking holes for screws passing through, and front end of the shell body has a protruding base that has a buffer body, and one side of the front end has a second locking board extending therefrom. The cover is disposed to face the shell body, so that a second receiving slot, a second stopping edge, a second side wing and a second locking hole are formed on the cover. Also, since the cover and the shell body are symmetric, they can face and engage with each other to form an oval tube for insertion of the handles. One end of the handle has an anti-slippery cover, and the other end has a through hole. Accordingly, a novel structure of a gardening scissor handle is formed.

Comparing with conventional techniques, the present invention has the following advantages:

(a) the connecting block and the cover are used to cover entire handle, and the screws are used to lock the handle to generate strong conjugation strength, so the blades does not separate from the handles due to reversely exerted force;

(b) the connecting block and the cover are forged products that cover entire handle, and the locking board and the second locking board are locked and conjugated with each other to disperse some forces to avoid deformation of the connecting block from one specific location, so that the blades, connecting block, cover and the handles can stay together tightly;

(c) the connecting block and the cover are made separately and then put together, which does not need to be formed as one piece. Furthermore, the receiving slot and the second receiving slot have one open side to significantly reduce the difficulty in manufacturing process regarding the connecting block and the cover; and (d) the connecting block and the cover are made separately with the receiving slots having one open side to significantly reduce the difficulty of opening a mold, so the cost for opening the mold is reduced, which makes the manufacturer more competitive in the market.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
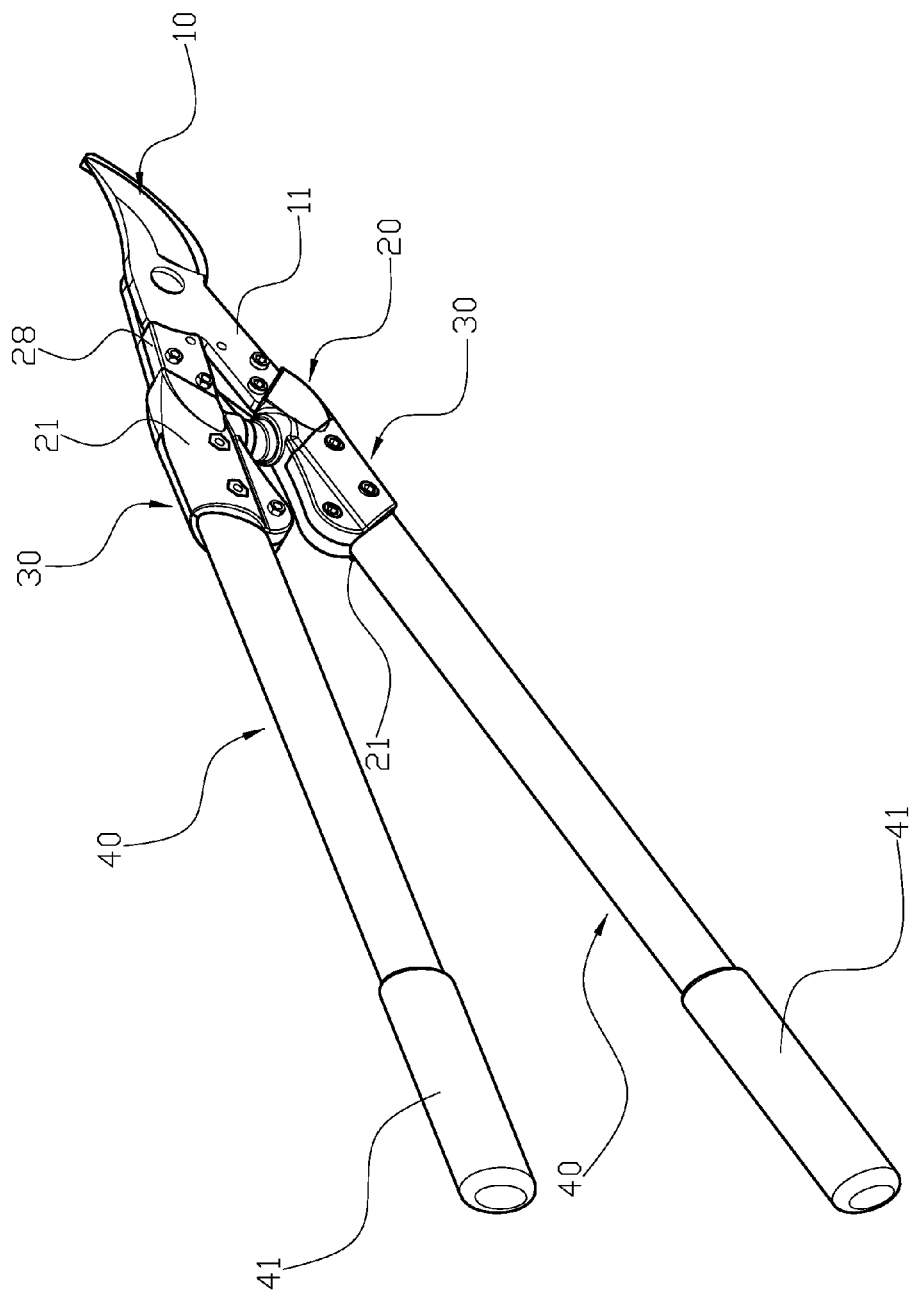
FIG. 1 illustrates a three-dimensional assembled view in the present invention.
Figure 2:
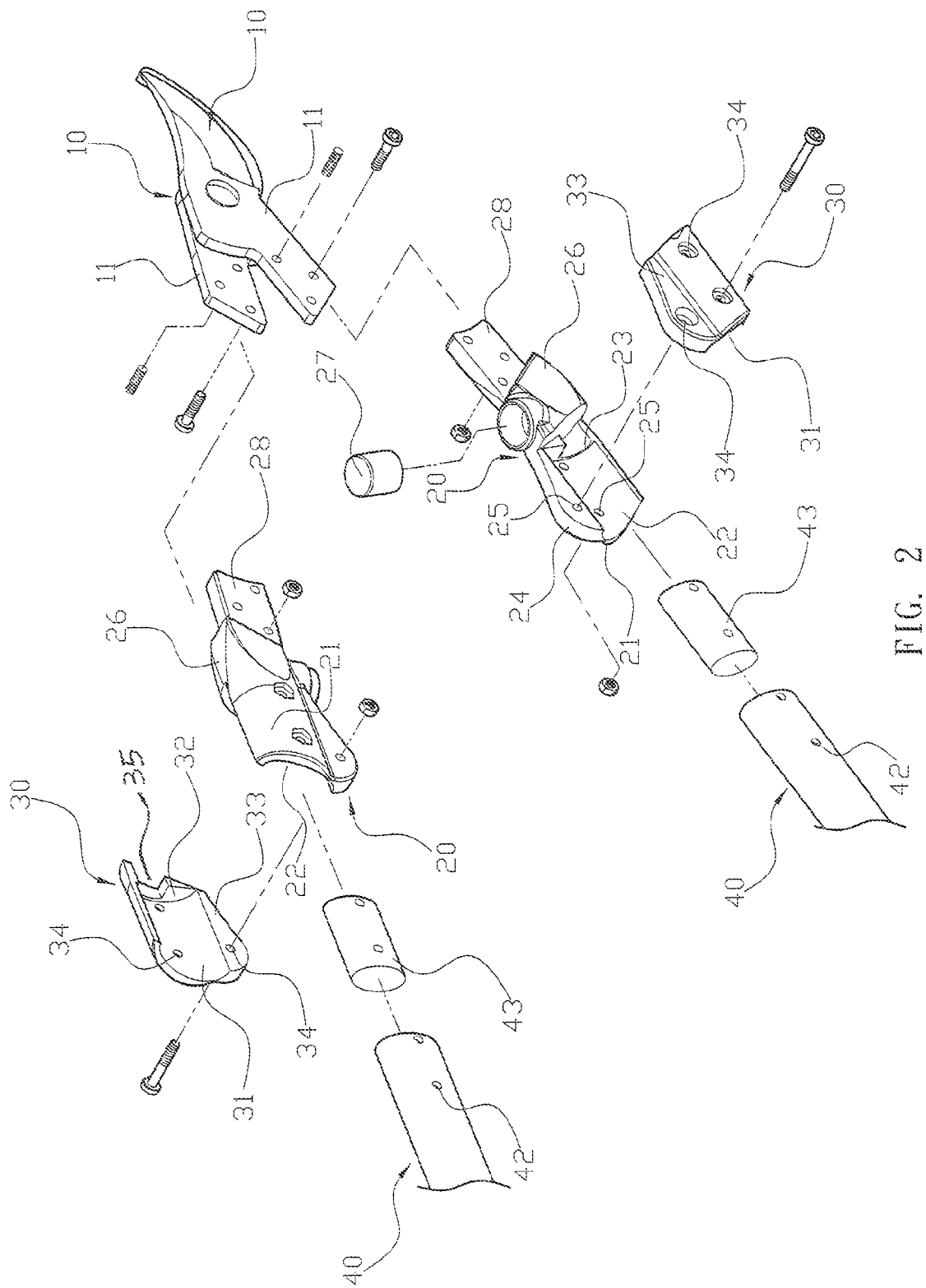
FIG. 2 illustrates a three-dimensional exploded view in the present invention.
Figure 3:
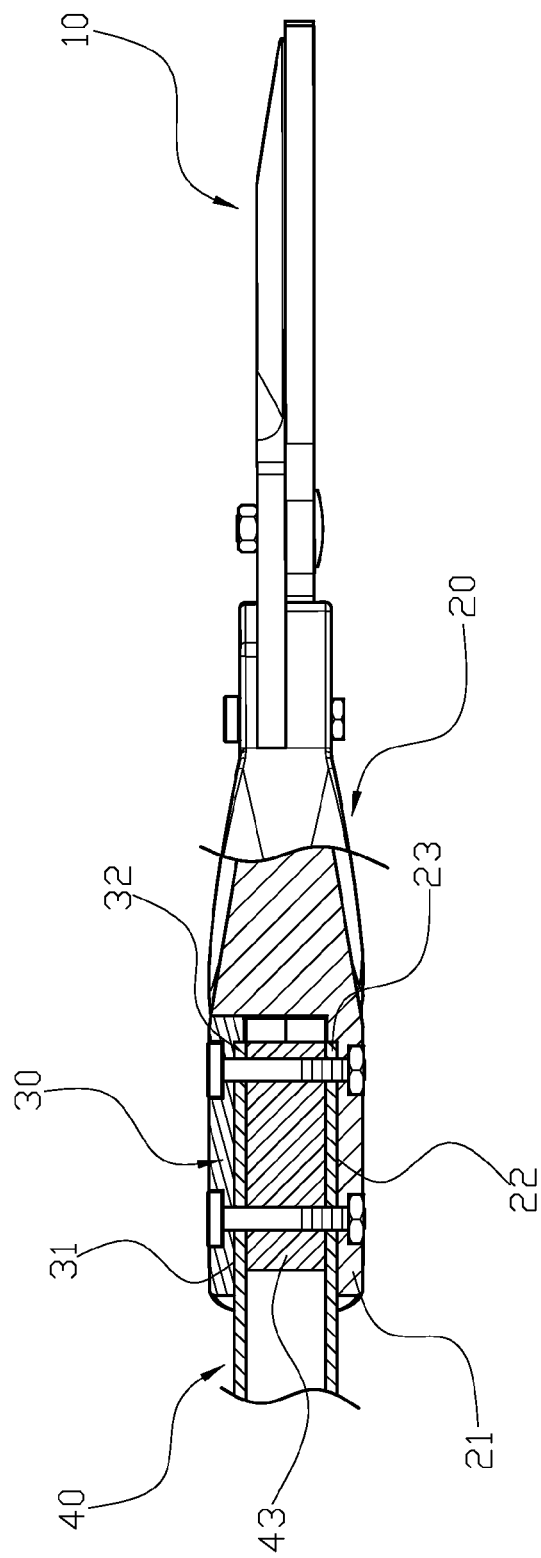
FIG. 3 illustrates a schematic sectional view in the present invention.
Figure 4:
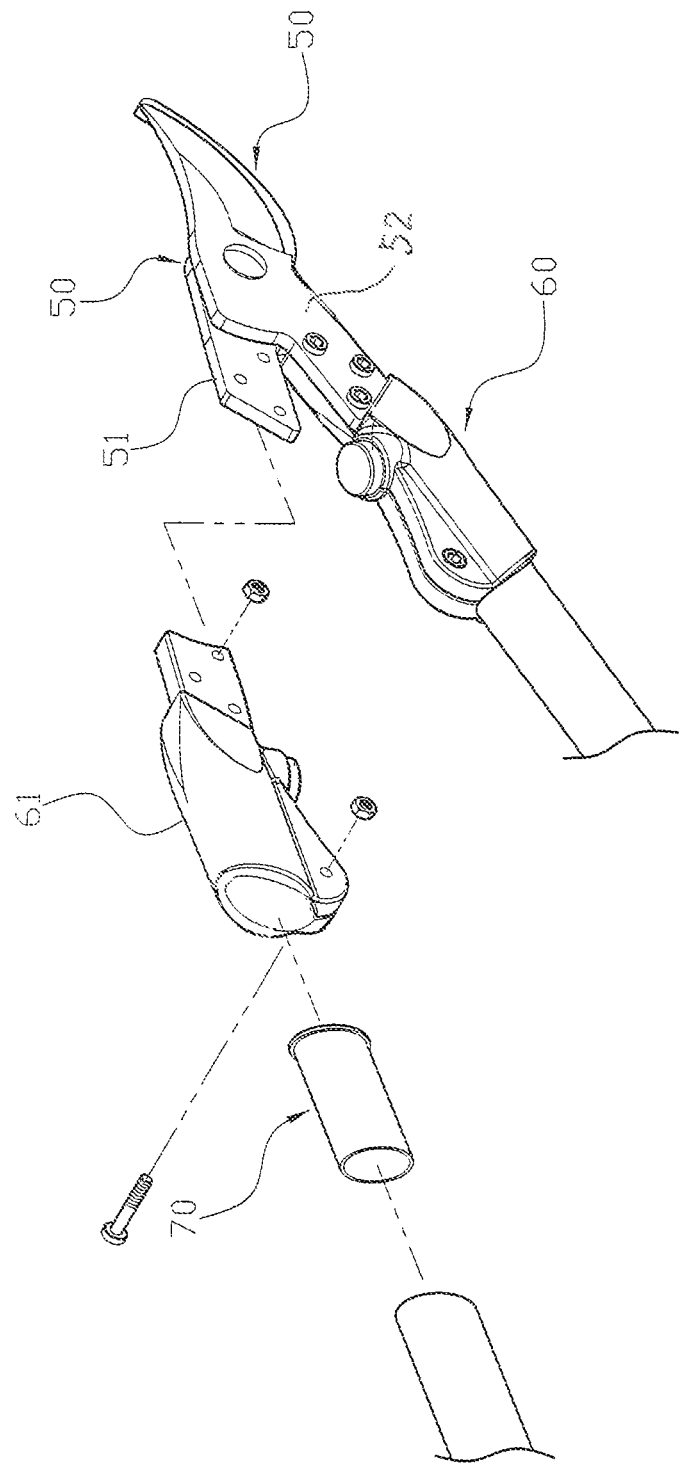
FIG. 4 illustrates a three-dimensional exploded view of a prior art.

In order to further understand the goal, characteristics and effect of the present invention, a number of embodiments along with the drawings are illustrated as following:

Referring to FIGS. 1 to 3, gardening scissors in the present invention include two blades (10) facing each other, two connecting blocks (20), two covers (30) and two handles (40), wherein each blade (10) is equipped with a perforation at a middle section, so a nut and a screw can engage with each other to secure the two blades (10) in a fixed position, and a locking board (11) is extended from one side of rear end of two blades (10). The connecting blocks (20) have a (half) shell body (21) facing the cover (30), and a receiving slot (22) with half-oval shape extending from rear end of the shell body (21). Front end of the receiving slot (22) has a stopping edge (23) defining a first notch (231), one side of which has a side wing (24) extending therefrom. The side wing (24) and the shell body (21) both have locking holes (25) for screws passing through, and front end of the shell body (21) has a protruding base (26) that has a buffer body (27), and one side of the front end has a second locking board (28) extending therefrom. The cover (30) is disposed to face the shell body (21), so that a second receiving slot (31), a second stopping edge (32) defining a second notch (35), a second side wing (33) and a second locking hole (34) are formed on the cover (30). Also, since the cover (30) and the shell body (21) are symmetric, they can face and engage with each other to form an oval tube for insertion of the handles (40). One end of the handle (40) has an anti-slippery cover (41), and the other end has a through hole (42).

Referring to FIGS. 1 and 3 for the assembly of the structure, the cover (30) covers the shell body (21) of the connecting block (20), so the receiving slot (31) (of the cover (30)) and the second receiving slot (22) (of the shell body (21)) face each other and form an oval hole for the handle (40). When the handle (40) is inserted, the front end touches and stops at the stopping edge (23) and the second stopping edge (32), so that the through hole (42) can align with the locking hole (25) and the second locking hole (34). When assembling the structure, the connecting block (20) and cover (30) can be secured at front end of the handle (40), and the locking board (11) of the blade (10) stacks with the second locking board (28) of the connecting block (20) and locks with screws. So, the blades (10) and the handles (40) can be driven by the conjugation of the connecting block (20) and the cover (30), and the handles (40) can be used to drive two blades (10) to cut.

Alternatively, according to FIGS. 2 and 3, a solid block (43) can be put into the front end of the handle (40) and then engages with the connecting block (20) and the cover (30). The solid block (43) also has a hole for screws passing through and the solid block (43) can be used to reinforce the handle (40) to avoid deformation of the handle due to external forces.

According to the structure shown in the embodiments, the present invention has the following advantages: (a) the connecting block (20) and the cover (30) are used to cover entire handle (40), and the screws are used to lock the handle to generate strong conjugation strength, so the blades (10) does not separate from the handles (40) due to reversely exerted force; (b) the connecting block (20) and the cover (30) are forged products that cover entire handle (40), and the locking board (11) and the second locking board (28) are locked and conjugated with each other to disperse some forces to avoid deformation of the connecting block (20) from one specific location, so that the blades (10), connecting block (20), cover (30) and the handles (40) can stay together tightly; (c) the connecting block (20) and the cover (30) are made separately and then put together, which does not need to be formed as one piece. Furthermore, the receiving slot (22) and the second receiving slot (31) have one open side to significantly reduce the difficulty in manufacturing process regarding the connecting block (20) and the cover (30); (d) the connecting block (20) and the cover (30) are made separately with the receiving slots (22) (31) having one open side to significantly reduce the difficulty of opening a mold, so the cost for opening the mold is reduced, which makes the manufacturer more competitive in the market.

Having described the invention by the description and illustrations above, it should be understood that these are exemplary of the invention and are not to be considered as limiting. Accordingly, the invention is not to be considered as limited by the foregoing description, but includes any equivalent

What is claimed is:

1. Gardening scissors comprising: first and second blades facing each other, first and second connecting blocks, first and second covers, first and second handles, wherein each of the first and second blades have a middle section with a perforation that receives a nut and screw to secure the first and second blades in a fixed position, and a blade locking board extending from one side of a rear end of each of the first and second blades, and a through hole at a front end of both the first and second handles, wherein each of the first and second connecting blocks respectively has a first shell body and a second shell body respectively facing the first and second covers, and a first receiving slot and a second receiving slot respectively extending from rear ends of each of the first and second shell bodies, and a front end of the first receiving slot has a first stopping edge defining a first notch, a front end of the second receiving slot has a second stopping edge defining a second notch, one side of each of the first and second covers having a first side wing and a second side wing respectively extending therefrom, wherein the first and second side wings and the first and second shell bodies have first and second locking holes respectively to receive screws, and a front end of each of the first and second bodies has a first protruding base and a second protruding base respectively, and one side of front ends of each of the first and second shell bodies has a body locking board respectively extending therefrom, and wherein the first and second covers are disposed to respectively face the first and second shell bodies to engage to form tubes for insertion of the first and second handles.

2. The gardening scissors of claim 1, wherein when the first and second handles are inserted, the front ends touch and stop respectively at the first stopping edge and the second stopping edge, so that the through holes are respectively aligned with the first locking hole and the second locking hole, and when assembling the gardening scissors, the first and second connecting blocks and first and second covers are respectively secured at the front ends of the first and second handles, and the blade locking boards and the body locking boards respectively stack with each other and are locked with screws, so that the first and second blades and the first and second handles are driven by conjugation of the first and second connecting blocks and the first and second covers, and the first and second handles are used to drive the first and second blade to perform a cutting function.

3. The gardening scissors of claim 1, wherein each of the protruding bases has a buffer body.

4. The gardening scissors of claim 1, wherein each of the first and second receiving slots are of a half-oval shape.

5. The gardening scissors of claim 1, wherein a sold block is put in the front end of each of the first and second handles and the blocks respectively engage with the first and second connecting blocks and the first and second covers, and each of the blocks have a hole to receive screws to respectively reinforce the first and second handles to avoid deformation due to external forces.

* * * * *